(12) United States Patent
Bui et al.

(10) Patent No.: US 6,762,900 B2
(45) Date of Patent: Jul. 13, 2004

(54) METHOD AND APPARATUS FOR PERFORMING POSITION ERROR SIGNAL CONDITIONING OF LTO MEDIA SERVO FORMAT WRITTEN-IN VELOCITY VARIATION

(75) Inventors: Nhan X. Bui, Tucson, AZ (US); John Alexander Koski, Tucson, AZ (US); Akimitsu Sasaki, Yokohama (JP); Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 09/907,165

(22) Filed: Jul. 17, 2001

(65) Prior Publication Data

US 2003/0016466 A1 Jan. 23, 2003

(51) Int. Cl.⁷ .......................... G11B 5/584; G11B 15/18
(52) U.S. Cl. ...................................... 360/77.12; 360/71
(58) Field of Search ................................ 360/75, 77.01, 360/77.12, 73.04, 73.09, 73.11, 73.12, 73.13, 48, 51, 71, 72.1, 72.2, 74.1, 74.4

(56) References Cited

U.S. PATENT DOCUMENTS

| | | | |
|---|---|---|---|
| 4,151,566 A | 4/1979 | Ohrman | 360/72.1 |
| 4,217,615 A | 8/1980 | Suzuki | 360/137 |
| 4,363,042 A | 12/1982 | Kimura et al. | 360/71 |
| 4,427,166 A | 1/1984 | Oishi et al. | 242/199 |
| 4,466,582 A | 8/1984 | Shiba | 242/197 |
| 4,494,711 A | 1/1985 | Van Pelt | 242/184 |
| 4,996,611 A | 2/1991 | Ito | 360/72.3 |
| 5,016,123 A | 5/1991 | Karsh | 360/69 |
| 5,032,937 A | 7/1991 | Suzuki et al. | 360/73.06 |
| 5,323,286 A | 6/1994 | Faul | 360/137 |
| 5,447,279 A | 9/1995 | Janssen et al. | 242/358 |
| 5,450,257 A | 9/1995 | Tran et al. | 360/76 |
| 5,532,583 A | 7/1996 | Davis et al. | 324/203 |
| 5,572,393 A | 11/1996 | Church et al. | 360/130.21 |
| 5,675,448 A | 10/1997 | Molstad et al. | 360/77.12 |
| 5,793,573 A | 8/1998 | Eckberg et al. | 360/261.3 |
| 5,875,066 A | 2/1999 | Ottesen | 360/77.11 |
| 5,930,065 A * | 7/1999 | Albrecht et al. | 360/72.2 |
| 5,995,317 A | 11/1999 | Ottesen | 360/77.04 |
| 6,018,434 A | 1/2000 | Saliba | 360/77.13 |
| 6,049,441 A | 4/2000 | Ottesen | 360/77.04 |
| 6,082,653 A | 7/2000 | Abedor et al. | 242/357 |
| 6,111,719 A * | 8/2000 | Fasen | 360/73.04 |
| 6,118,630 A | 9/2000 | Argumedo | 360/130.21 |
| 6,320,719 B1 * | 11/2001 | Albrecht et al. | 360/77.12 |
| 6,580,581 B1 * | 6/2003 | Bui et al. | 360/78.02 |

OTHER PUBLICATIONS

"Position Calibration Tool for Magnetic Moving Tape Drive Heads," IBM, Technical Disclosure Bulletin, vol. 37, No. 09, Sep. 1994, pp. 501–506.
"Capacitive Tape Loop Position Detector," IBM, Technical Disclosure Bulletin, vol. 14, No. 06, Nov. 1971, pp. 1830–1831.
Abstract of JP58189877A, Nov. 5, 2003, Hiroyuki et al.

* cited by examiner

Primary Examiner—Andrew L. Sniezek
(74) Attorney, Agent, or Firm—Crawford Maunu PLLC

(57) ABSTRACT

A method and apparatus for performing position error signal conditioning of LTO media servo format written-in velocity variation is disclosed. According to the present invention only the signals demonstrating velocity deviations are filtered. A magnetic recording tape includes servo signal bursts of flux transitions recorded thereon. The servo bursts include a configuration of stripes of A spacings and B spacings and a servo head disposed proximate to the magnetic recording tape senses the flux transitions of the servo signal bursts. A servo controller, coupled to the servo head, receives the sensed signals from the servo head. The servo controller further includes a filter for filtering the B time interval servo signal components. Then a position error signal according to:

$$PES = ref - A/(B \text{ filtered}),$$

wherein A represents unfiltered A time interval servo components and B filtered is filtered B time interval servo components.

34 Claims, 10 Drawing Sheets

METHOD AND APPARATUS FOR PERFORMING POSITION ERROR SIGNAL CONDITIONING OF LTO MEDIA SERVO FORMAT WRITTEN-IN VELOCITY VARIATION

BACKGROUND OF THE INVENTION

1. Field of the Invention

This invention relates in general to data storage systems, and more particularly to a method and apparatus for performing position error signal conditioning of LTO media servo format written-in velocity variation.

2. Description of Related Art

Data loss is a serious threat to companies of all sizes, and catastrophic data loss can destroy a business. But most data loss isn't the result of a big disaster, it's caused by human error, viruses, and disk malfunctions. A suitable backup routine provides the best protection against data loss of all kinds. And tape technology remains the most efficient and cost-effective means to perform system backup, whether for a small business or a global 24×7 operation.

Tape remains unrivaled in terms of cost and capacity for data storage, and should play an increasing crucial role in corporate data protection strategies. No other technology offers the same combined low cost and high capacity advantage of tape. While other technologies may offer strengths in one or more areas, overall, they do not meet the entire set of customer needs that tape addresses.

Tape drives make backup fast, easy, reliable and affordable. Speed is critical because your data is constantly growing while the time available for backup is shrinking. Even the slowest tape drive writes 1 MB per second and the fastest 30 MB per second, which means a 200 GB backup can be completed in less than two hours. Furthermore, unlike other storage methods, tape drives offer a range of media that allows you to back up all the data on a small to medium-sized server. Tape backup also captures system setup information, as well as data, allowing an entire system to be restored in the event a disaster strikes. Also, backups can be scheduled to occur automatically at a time determined to be most convenient.

Another area where tape storage excels is when it comes to data protection. Tape has proved itself a reliable medium, and tape drives themselves have never been more reliable. Easily portable, tapes have the added advantage of being simple to remove and store offsite, so keeping a disaster recovery copy is less of a burden.

In terms of affordability, tape is the most cost-effective way to store large amounts of data per gigabyte of storage. The compact size of tape cartridges also helps keep down your storage costs.

Nevertheless, the tape industry has become fragmented with the proliferation of formats and technologies that have overly complicated customer buying decisions. Therefore, LTO Technology (or Linear Tape-Open Technology) has been developed to combine the advantages of linear multi-channel bi-directional tape formats in common usage today with enhancements in the areas of timing-based servo, hardware data compression, optimized track layouts and high efficiency error correction code to maximize capacity and performance.

The new LTO tape product uses a tape format that has longitudinally prewritten servo tracks. The servo tracks provide a timing-based track-following position error system. The tracks contain a repeated pattern of recorded flux transitions that occur as grouped bursts of 5, 5, 4, and 4 transitions. The timing between the sets of 5-bursts and between sets of 4-bursts provides the position information for the track following system. Additionally, the individual transitions within the 5-bursts are phase-shifted in a manner that encodes longitudinal position information (LPOS) into the servo tracks. By detecting the phase-encoded LPOS information, the tape transport system determines the tape position relative to landmarks lengthwise down the tape. The LPOS information is used to keep track of the longitudinal position of data records written onto or read from the tape, and is used to locate those data records when the reading or writing process temporarily stops. The LPOS location of data files on tape is also stored in the volume control data for use to locate the data files during a later tape cartridge load for reading, or for write-appending new files onto the end of the last file written to the tape. The LPOS data is thus used as the primary positional information for the tape transport servo control system, it is used in the decision process for starting and stopping the tape, and for backhitching the tape in order to position the read-write heads at the beginning of a data record at the required velocity and track position which allows the start of a new data transfer operation.

In determining the Position Error Signal, the repeated pattern of recorded flux transitions occur as grouped bursts of 5, 5, 4, and 4 transitions. However, because of longitudinal velocity deviations during the formatting process, when the servo patterns are recorded onto the tapes, an oscillation in the PES signal will result. This oscillation will in turn degrade the performance of the track following servo system. In many cases, the problem is so severe that, it causes an intolerable number of 'stop writes' (a vibration that cause more than 5 um of tracking error signal). A direct filtering out of this oscillation on the PES is not feasible since it will cause too much loss of phase margin and make the overall tracking following servo system unstable.

It can be seen that there is a need for a method and apparatus for performing position error signal conditioning of LTO media servo format written-in velocity variation.

SUMMARY OF THE INVENTION

To overcome the limitations in the prior art described above, and to overcome other limitations that will become apparent upon reading and understanding the present specification, the present invention discloses a method and apparatus for performing position error signal conditioning of LTO media servo format written-in velocity variation.

The present invention solves the above-described problems by filtering only the signals demonstrating velocity deviations.

A method in accordance with the principles of the present invention includes detecting flux transitions in servo signal bursts to produce detected servo signals, filtering detected servo signals exhibiting velocity vibrations and computing position error signals using filtered detected servo signals and detected servo signals not requiring filtering.

Other embodiments of a method in accordance with the principles of the invention may include alternative or optional additional aspects. One such aspect of the present invention is that the flux transitions comprise a series of A-shaped burst pairs.

Another aspect of a method of the present invention is that the series of A-shaped burst pairs extend along the media.

Another aspect of a method of the present invention is that the signals exhibiting velocity vibrations are flux transitions in the burst of servo signals that have a spacing that depends on the precision of the formatter velocity.

Another aspect of a method of the present invention is that the signals not exhibiting velocity vibrations are flux transitions in the burst of servo signals that have a spacing that is dependent upon the fixed structure of the servo burst formatter head.

Another aspect of a method of the present invention is that the flux transitions in servo signal bursts include a first and second burst forming a first A-shaped burst pair, a third and fourth burst forming a second A-shaped burst pair, and a fifth and sixth burst forming a third A-shaped burst pair, wherein each burst comprises a plurality of legs and wherein each burst in a burst pair are angled toward each other, each of the A-shaped burst pairs having a spacing that is dependent upon the fixed structure of the servo burst formatter head, and the spacing between burst pairs being depends on the precision of the formatter velocity.

Another aspect of a method of the present invention is that a time measurement of the spacing between flux transitions in the third and fourth burst and between the flux transitions in the fifth and sixth burst comprises an A time interval and the spacing between the flux transitions in the second and fourth burst and between the flux transitions in the fourth and sixth burst comprise a B time interval.

Another aspect of a method of the present invention is that the B time interval exhibit velocity vibrations because of the precision of the formatter velocity, wherein the position error signal is computed according to:

$$PES=ref-A/(B \text{ filtered}),$$

wherein A represents unfiltered A time interval servo components and B filtered represents filtered B time interval servo components.

Another aspect of a method of the present invention is that each A-shaped burst comprises at least four flux transition legs, wherein each A-shaped burst comprises at least four legs.

Another aspect of a method of the present invention is that the series of A-shaped burst pairs comprise a leading and a trailing edge, the A-shaped burst pairs providing an A-time interval measured by a servo head from the leading edge to the trailing edge of an A-shaped burst pair.

Another aspect of a method of the present invention is that each of the A-shaped burst pairs comprise a plurality of legs, wherein the legs of the burst pair are configured with a predetermined spacing at a first end and getting larger toward an opposite end at a predetermined angle to provide lateral position of the servo head.

Another aspect of a method of the present invention is that the series of A-shaped burst pairs comprise a leading and a trailing edge, the A-shaped burst pairs providing a B-time interval measured by a servo head from a leading edge of one A-shaped burst pair to the leading edge of the next A-shaped burst pair.

Another aspect of a method of the present invention is that the B-time interval is constant independent with the lateral position of the servo head.

Another aspect of a method of the present invention is that the B-time interval is modulated if the servo formatter has velocity variations during writing the format pattern, wherein the position error signal is computed according to:

$$PES=ref-A/(B \text{ filtered}),$$

wherein A represents the A-time interval and B filtered represents the filtered B-time interval.

In another embodiment of the present invention, a tape drive is provided. The tape drive includes a magnetic recording tape having servo signal bursts of flux transitions recorded thereon, the servo bursts comprising a configuration of stripes of A spacings and B spacings, a servo head disposed proximate the magnetic recording tape for sensing the flux transitions of the servo signal bursts and a servo controller, coupled to the servo head, for receiving the sensed signals from the servo head, the servo controller further comprising a filter for filtering the B time interval servo signal components and computing a position error signal according to:

$$PES=ref-A/(B \text{ filtered}),$$

wherein A represents unfiltered A time interval servo components and B filtered is filtered B time interval servo components.

Another aspect of a tape drive of the present invention is that the filter comprises a low pass filter.

Another aspect of a tape drive of the present invention is that the filter comprises a notch filter.

Another aspect of a tape drive of the present invention is that the filter comprises filtering software implemented in the servo controller.

In another embodiment of the present invention, an article of manufacture comprising a program storage medium readable by a computer is disclosed. The medium tangibly embodies one or more programs of instructions executable by the computer to perform a method for performing position error signal conditioning of LTO media servo format written-in velocity variation, wherein the method includes detecting flux transitions in servo signal bursts to produce detected servo signals, filtering detected servo signals exhibiting velocity vibrations and computing position error signals using filtered detected servo signals and detected servo signals not requiring filtering.

Another aspect of an article of manufacture of the present invention is that the flux transitions comprise a series of A-shaped burst pairs.

Another aspect of an article of manufacture of the present invention is that the series of A-shaped burst pairs extend along the media.

Another aspect of an article of manufacture of the present invention is that the signals exhibiting velocity vibrations are flux transitions in the burst of servo signals that have a spacing that depends on the precision of the formatter velocity.

Another aspect of an article of manufacture of the present invention is that the signals not exhibiting velocity vibrations are flux transitions in the burst of servo signals that have a spacing that is dependent upon the fixed structure of the servo burst formatter head.

Another aspect of an article of manufacture of the present invention is that the flux transitions in servo signal bursts include a first and second burst forming a first A-shaped burst pair, a third and fourth burst forming a second A-shaped burst pair, and a fifth and sixth burst forming a third A-shaped burst pair, wherein each burst comprises a plurality of legs and wherein each burst in a burst pair are angled toward each other, each of the A-shaped burst pairs having a spacing that is dependent upon the fixed structure of the servo burst formatter head, and the spacing between burst pairs being depends on the precision of the formatter velocity.

Another aspect of an article of manufacture of the present invention is that the spacing between flux transitions in the third and fourth burst and between the flux transitions in the fifth and sixth burst comprises an A time interval and the spacing between the flux transitions in the second and fourth burst and between the flux transitions in the fourth and sixth burst comprise a B time interval.

Another aspect of an article of manufacture of the present invention is that the B time intervals exhibit velocity vibrations because of the precision of the formatter velocity, wherein the position error signal is computed according to:

$$PES=ref-A/(B \text{ filtered}),$$

wherein A represents unfiltered A time interval servo components and B filtered represents filtered B time interval servo components.

Another aspect of an article of manufacture of the present invention is that each A-shaped burst comprises at least four legs.

Another aspect of an article of manufacture of the present invention is that the series of A-shaped burst pairs comprise a leading and a trailing edge, the A-shaped burst pairs providing an A-time interval measured by a servo head from the leading edge to the trailing edge of an A-shaped burst pair.

Another aspect of an article of manufacture of the present invention is that each of the A-shaped burst pairs comprise a plurality of legs, wherein the legs of the burst pair are configured with a predetermined spacing at a first end and a larger predetermined spacing at an opposite end to provide lateral position of the servo head.

Another aspect of an article of manufacture of the present invention is that the series of A-shaped burst pairs comprise a leading and a trailing edge, the A-shaped burst pairs providing a B-time interval measured by a servo head from a leading edge of one A-shaped burst pair to the leading edge of the next A-shaped burst pair.

Another aspect of an article of manufacture of the present invention is that the B-time interval is constantly independent with the lateral position of the servo head.

Another aspect of an article of manufacture of the present invention is that the B-time interval is modulated if the servo formatter has velocity variations during writing the format pattern, wherein the position error signal is computed according to:

$$PES=ref-A/(B \text{ filtered}),$$

wherein A represents the A-time interval and B filtered represents the filtered B-time interval.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for performing position error signal conditioning of LTO media servo format written-in velocity variation. The present invention filters only the signals exhibiting velocity deviations.

Figure 1:
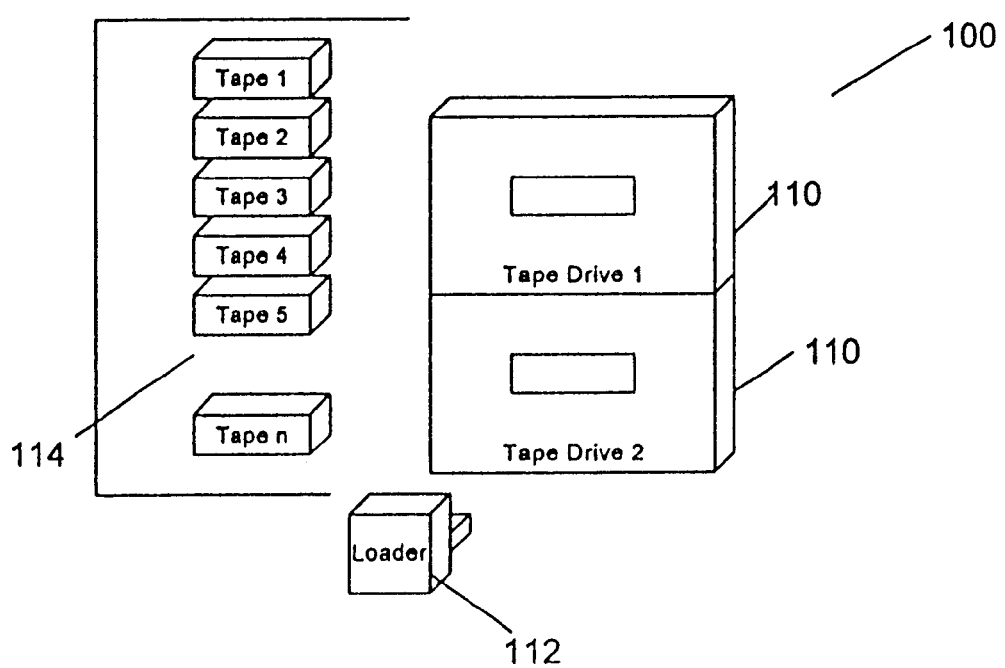
FIG. 1 illustrates a tape library system according to the present invention.

FIG. 1 illustrates a tape library system 100. The tape library system 100 includes at least one tape drive 110, a loader 112, and a library of tape cassettes or cartridges 114 that can be accessed by the loader 112 so as to load the tape drive 110 with an appropriately identified tape cassette or cartridge.

Figure 2:
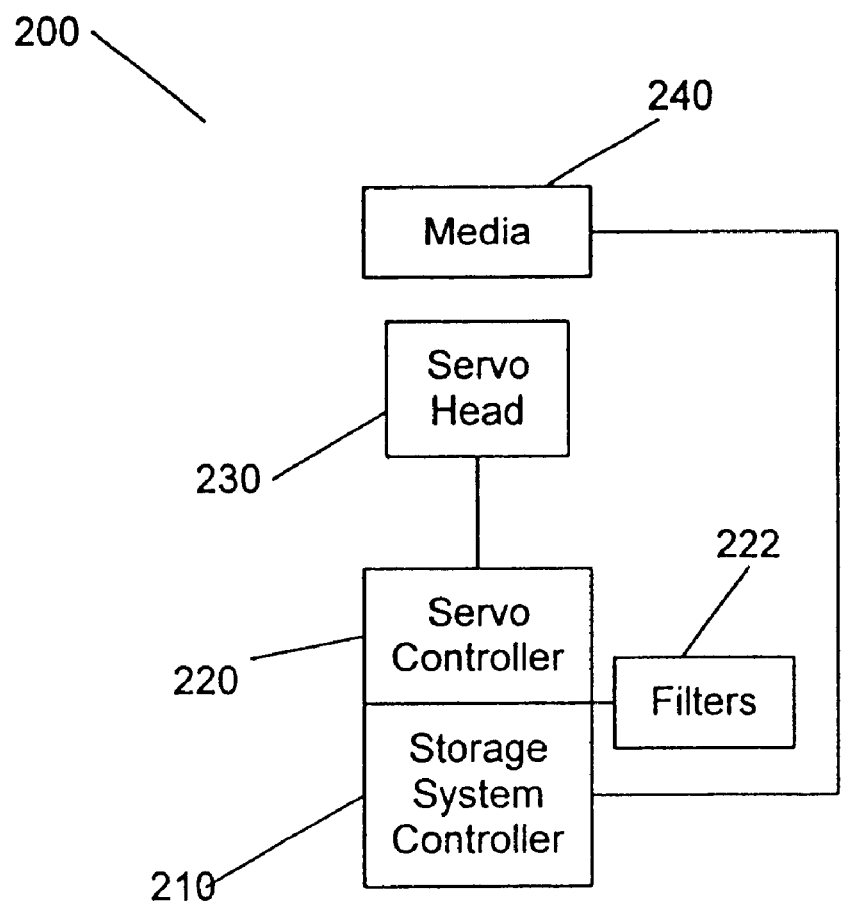
FIG. 2 illustrates a block diagram of a storage system according to the present invention.

FIG. 2 illustrates a block diagram of a storage system 200 according to the present invention. The storage system includes a controller 210 for controlling the operation of the different components of the storage system 200. A servo controller 220 is provided for processing servo signals received from the servo head 230. The system controller 210 positions the media 240 relative to the servo head 230 and the data head (not shown). In FIG. 2, filters 222 are also shown for processing the servo signals. Those skilled in the art will recognize that the filtering 222 may be implemented in hardware or may be implemented in software, e.g. in the storage controller 220 of the storage system controller 210. Further, those skilled in the art will recognize that the present invention is not meant to be limited to a particular type of storage system. However, those skilled in the art will recognize that the present invention is preferably meant to be used with a tape storage device, especially one that is configured according to the LTO Technology (or Linear Tape-Open Technology) as described above.

Figure 3:
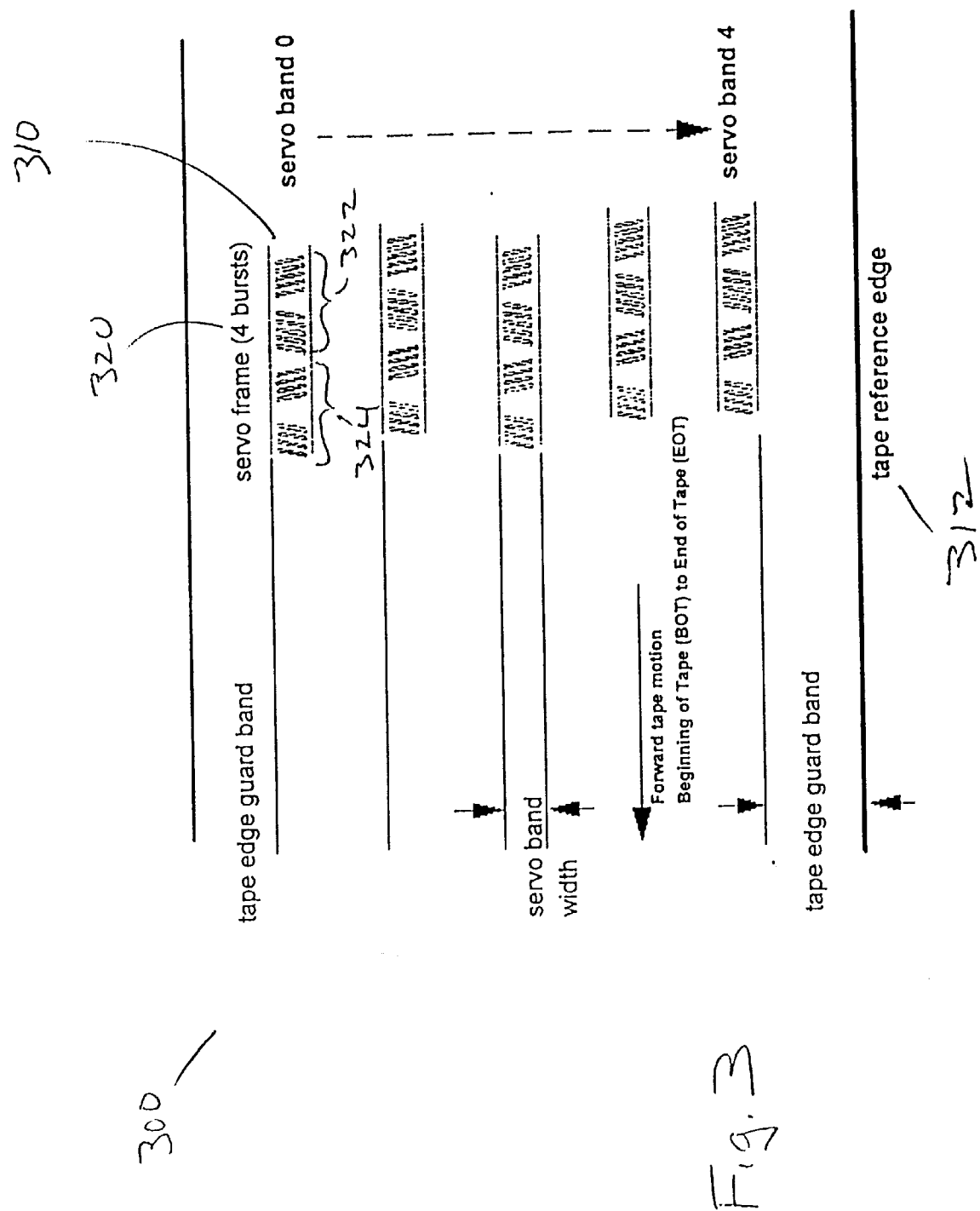
FIG. 3 illustrates the recording format according to the present invention.

A tape drive, configured according to LTO technology, uses an interleaved, serpentine, longitudinal recording format. FIG. 3 illustrates the recording format 300 according to the present invention. The first set of eight data tracks is written from near the physical beginning of the tape to near the physical end of the tape. The head then repositions to the next set of tracks for the return. This process continues until all tracks are written and the tape is full.

Servo tracks (also called bands) 310 enable accurate positioning of the tape drive head over the data track, ensuring that the head does not stray onto an adjacent track. They are necessary to support high data densities on the tape where the tracks are very close together. The servo bands 310 are written at time of manufacture of the cartridge, prior to the cartridge being usable for data storage and retrieval.

There are five servo bands, numbered 0 through 4, which make up the servo tracking mechanism on the tape. They are each located at specific distances from the tape reference edge 312. Within the servo bands are servo stripes, groups of which make up servo bursts. Four servo bursts 320 make up a servo frame; the first two bursts 322 (as written in the forward tape motion direction) contain five servo stripes and the second two bursts 324 contain four servo stripes.

Figure 4:
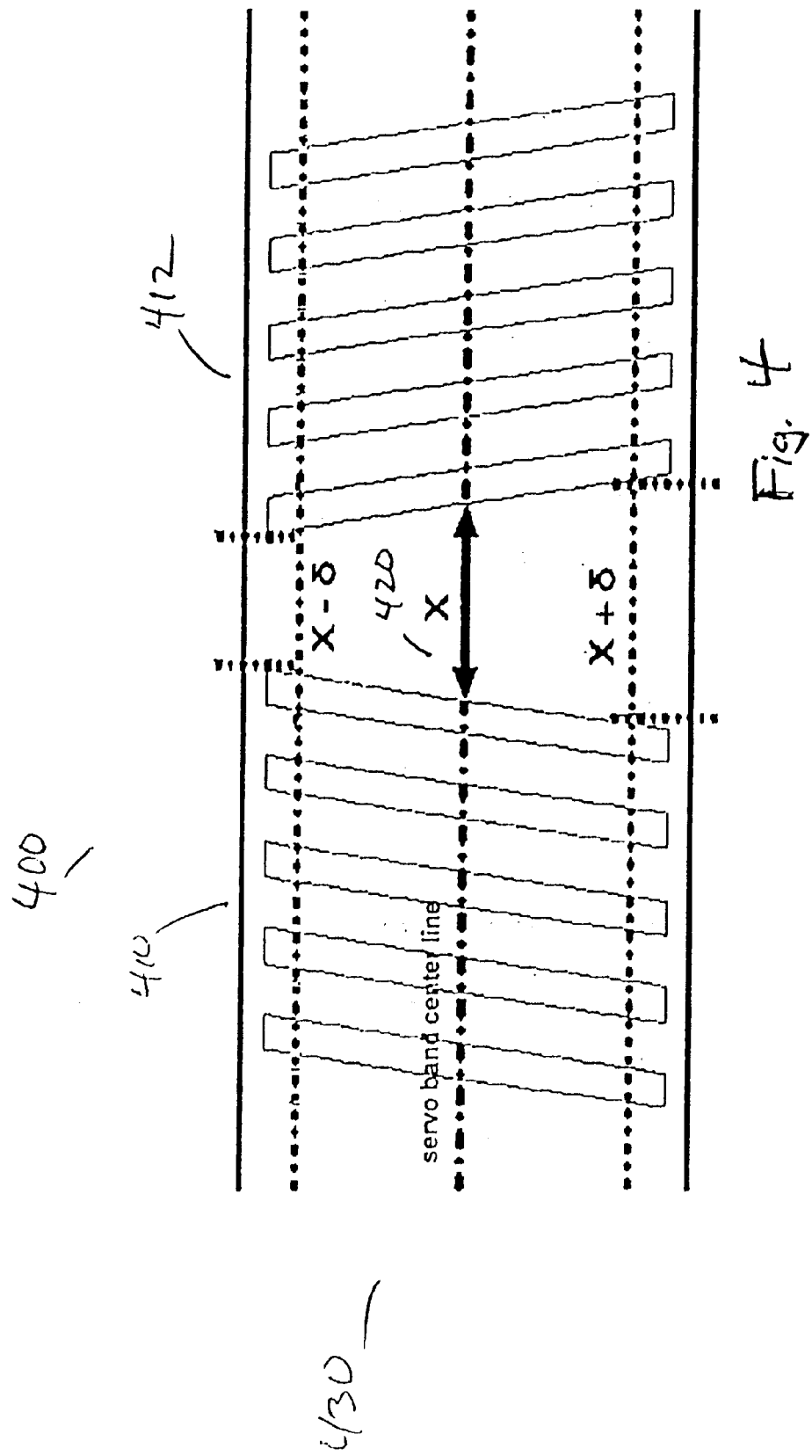
FIG. 4 illustrates a pair of servo burst according to the present invention.

FIG. 4 illustrates a pair of servo bursts 400 according to the present invention. The servo bursts pairs 410, 412 are at an angle to each other, and the servo heads move such that they keep a constant value 420 for the distance between the bursts. In this way the servo is able to follow a straight line within the servo band 430. Any small deviation away from the correct path causes a variation (plus or minus) in the gap between the bursts, e.g., x−δ or x+δ. Provided that the servo head element follows a straight line along the servo band, then the distance "x" 420 shown in FIG. 4 remains constant. Two servo bands are used simultaneously to provide two sources of servo information for increased accuracy.

In reality, the format specifies six nominal servo positions within each servo band, and, in addition, the servo head is made up of two servo head elements to address a single servo band. This means that, using the two elements, the servo head is able to reposition within the servo band 430 for the six forward and reverse data wraps within each data band. The distance between each servo position corresponds to the distance apart that the data tracks are written. This technology can be very finely tuned and is capable of supporting very high track densities using the same servo tracks because the currently used and defined six nominal positions are basically definitions of six different "x distances" 420 between servo bursts and not a fixed servo track. By defining additional "x distance" positions 420, it is possible to increase the number of tracks on a cartridge while still using the same cartridge and servo tracks.

Figure 5:
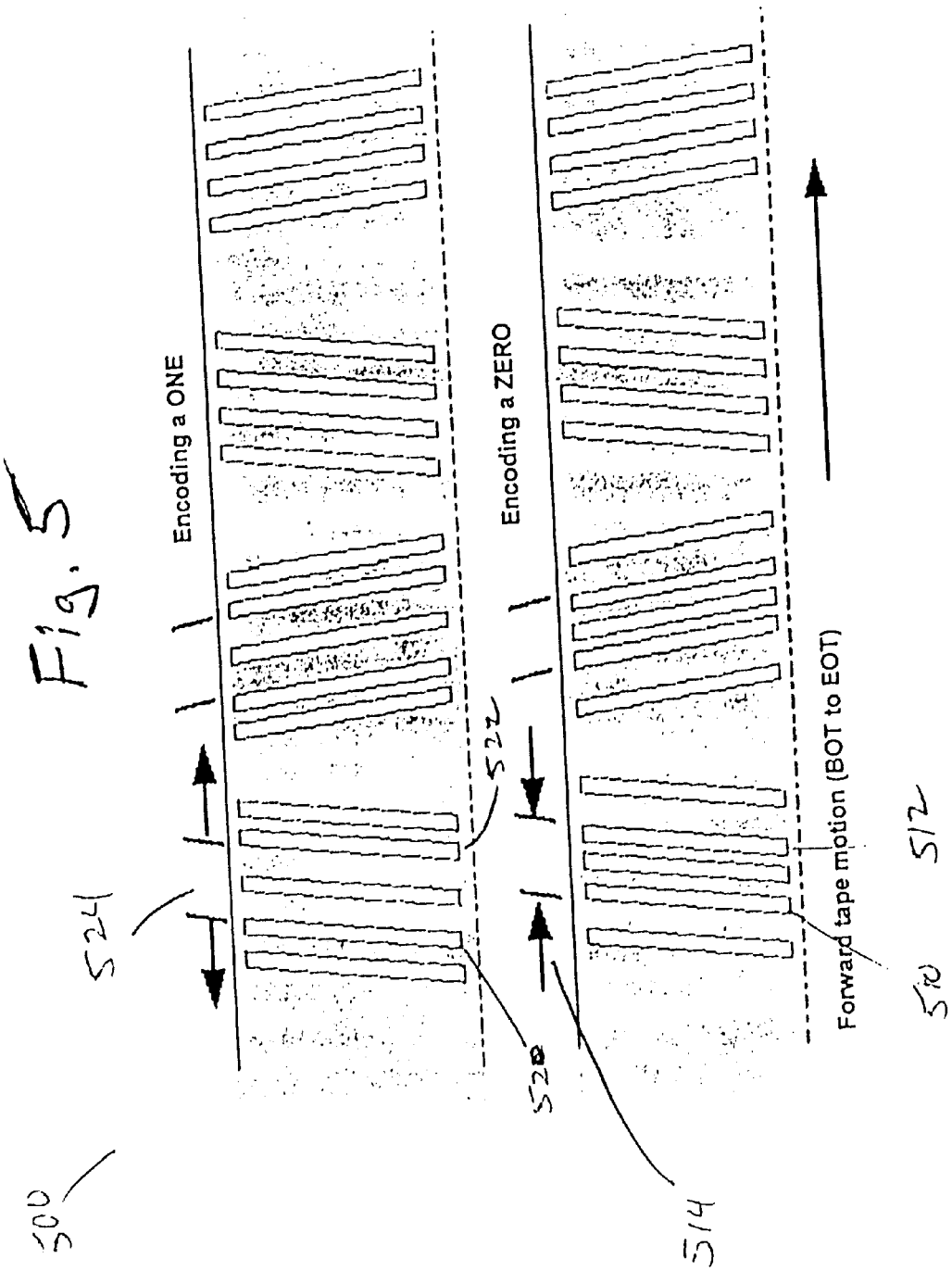
FIG. 5 illustrates the encoding of bits using the servo stripes within the servo bursts according to the present invention.

FIG. 5 illustrates the encoding of bits using the servo stripes within the servo bursts 500 according to the present invention. The servo band is designed not only for track following but also for recording the longitudinal position (LPOS). The absolute location down the length of the tape and the manufacturer data are recorded in LPOS "words", approximately every quarter of an inch (0.7 cm) along the tape. The LPOS word consists of symbols constructed from bit sequences (ones and zeros); these bits are encoded within the servo frames.

Each servo frame encodes one bit using the first pair of servo bursts. When servo stripes 2 510 and 3 512 (out of the five) are shifted inwards 514, this encodes a zero; when servo stripes 2 520 and 3 522 are shifted outwards 524, this encodes a one. The LPOS word contains 36 bits and thus has a length of 36 servo frames. Each of the 5 servo bands on the tape may be uniquely identified by the relative positions of the frames down the tape, in adjacent servo bands. The offset of the frames between servo band 'n' and servo band 'n+1' are specific to each servo band (0 and 1, 1 and 2, 2 and 3, or 3 and 4). Thus the drive can move the head directly from the physical beginning of the tape to a specific logical position for reading or writing.

Figure 6:
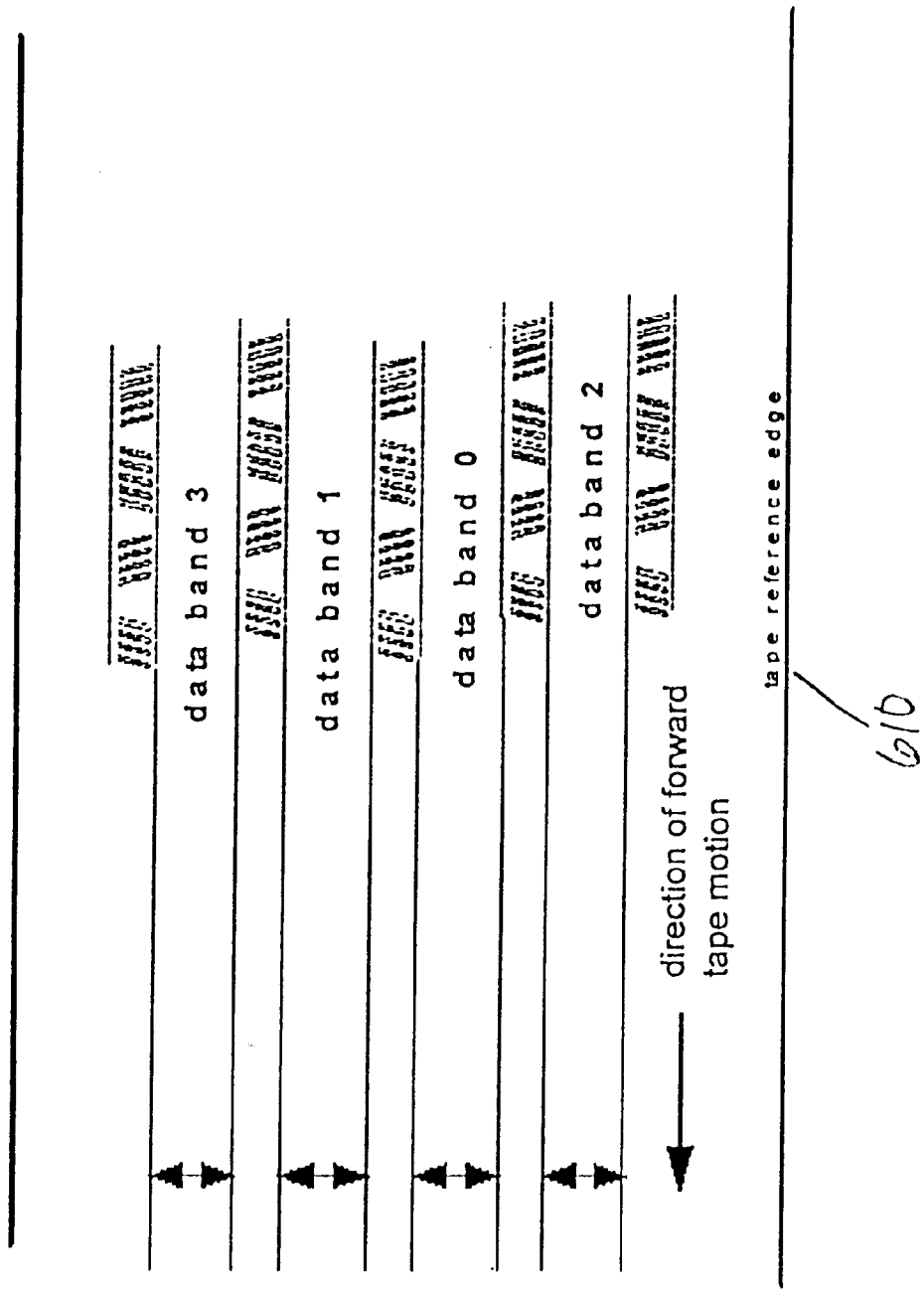
FIG. 6 illustrates the area between adjacent servo bands that is defined as the data bands according to the present invention.

FIG. 6 illustrates the area between adjacent servo bands that is defined as the data bands 600. There are 4 data bands numbered 2, 0, 1, and 3, where data band number 2 is nearest the reference edge 610 of the tape and data band 3 is furthest away. The data bands are written in sequence beginning with 0 (in the center of the tape) and ending with 3.

Each data band consists of 96 tracks which are recorded 8 tracks at a time from one end of the tape to the other in the following way:

The head is positioned over data band 0, and the first set of 8 tracks are written from the physical beginning of the tape to the physical end.

The head physically repositions (using a different servo position within the same servo bands) and switches electronically to a second set of 8 write elements in order to write 8 tracks in the reverse direction back to the physical beginning of the tape.

The head physically repositions again, and, switching back to the first set of write elements, writes another set of 8 tracks to the physical end of the tape.

The head continues to switch and index in this manner until all 96 tracks are written and the head is back at the physical beginning of the tape.

The head moves to data band 1 to continue writing the data.

A group of tracks recorded concurrently in the physical forward or the physical backward direction is called a wrap. Wraps recorded while the tape is moving from BOT to EOT are forward wraps; wraps recorded while the tape is moving from EOT to BOT are reverse wraps. The wraps are recorded in a serpentine fashion, as described—a forward wrap, then a reverse wrap. They are numbered sequentially in the order that they are processed, starting with wrap 0. Thus there are 6 forward wraps making up a data band and 6 reverse wraps. The individual tracks within a wrap are interleaved with tracks from other wraps; in other words, adjacent tracks are not part of the same wrap.

Figure 7:
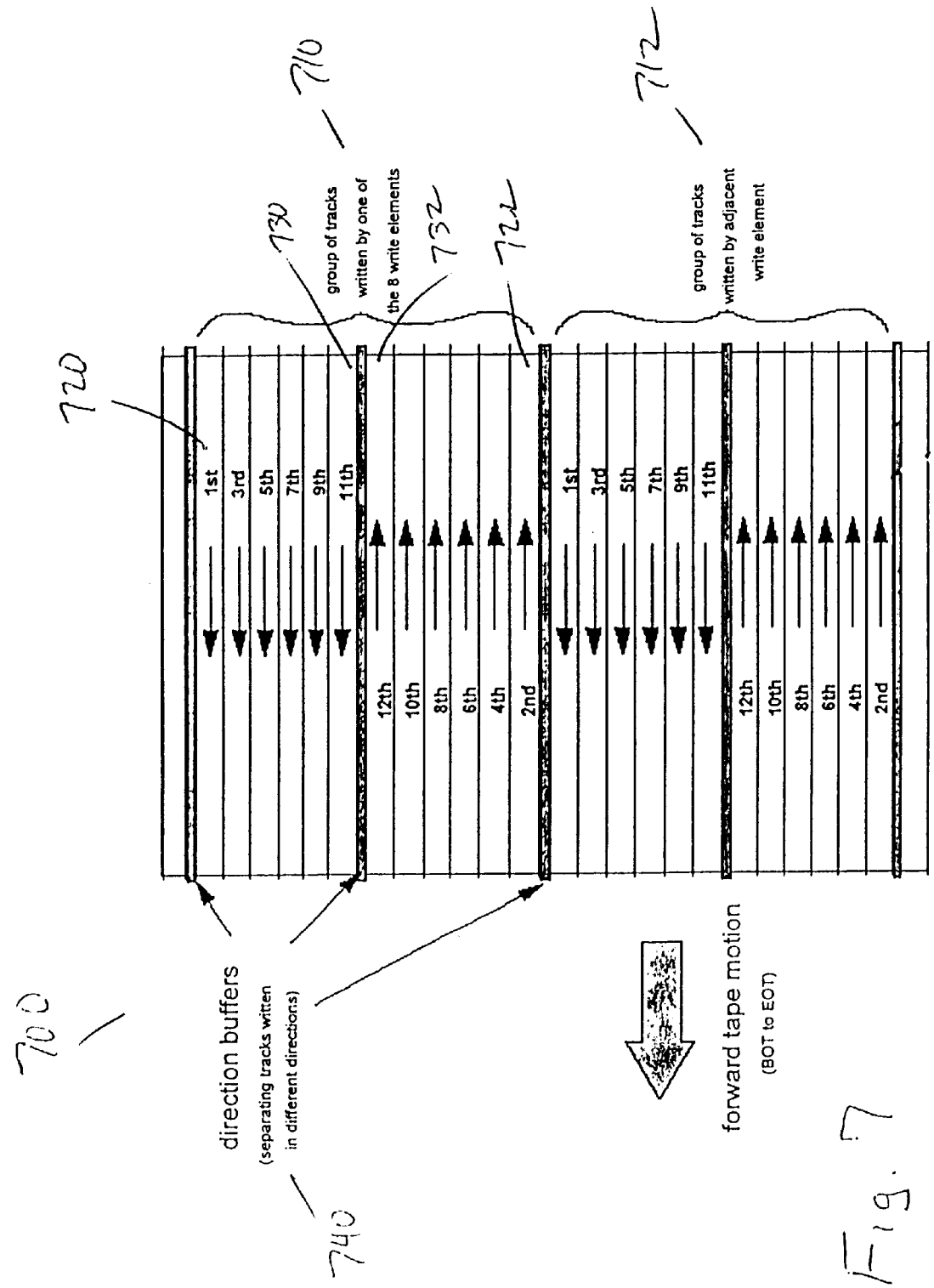
FIG. 7 is a magnified view of the data band illustrated in FIG. 6 showing the sequence of a data band in which the tracks are written.

FIG. 7 expands on FIG. 6 to illustrate the sequence of a data band 700 in which the tracks are written. One data band 700 is magnified to show a first area 710 written by a first of one of the 8 write elements and a second area 712 written by an adjacent write element. This is one quarter of the width of the data band. You can see that the tracks are written in an inward spiral (serpentine) manner; the 1st 720 and 2nd 722 tracks are furthest away from one another while the 11th 730 and 12th 732 tracks are adjacent to one another. The space between tracks written in opposing directions is called a direction buffer 740. This space is designed to minimize magnetic interference between tracks written in opposite directions (cross-track interference).

Read/verify elements are built into the tape head in the drive. The data is written by the write elements and then immediately passes the read/verify elements and is checked for errors. If any errors are found the block of data is rewritten further down the tape. The total number of data tracks across the width of the tape is 384, and they are numbered 0 through 383. The track numbering is not relating to the sequence in which the tracks are written, data track 383 being the data track closest to the reference edge of the tape, and data track 0 being furthest away.

Figure 8:
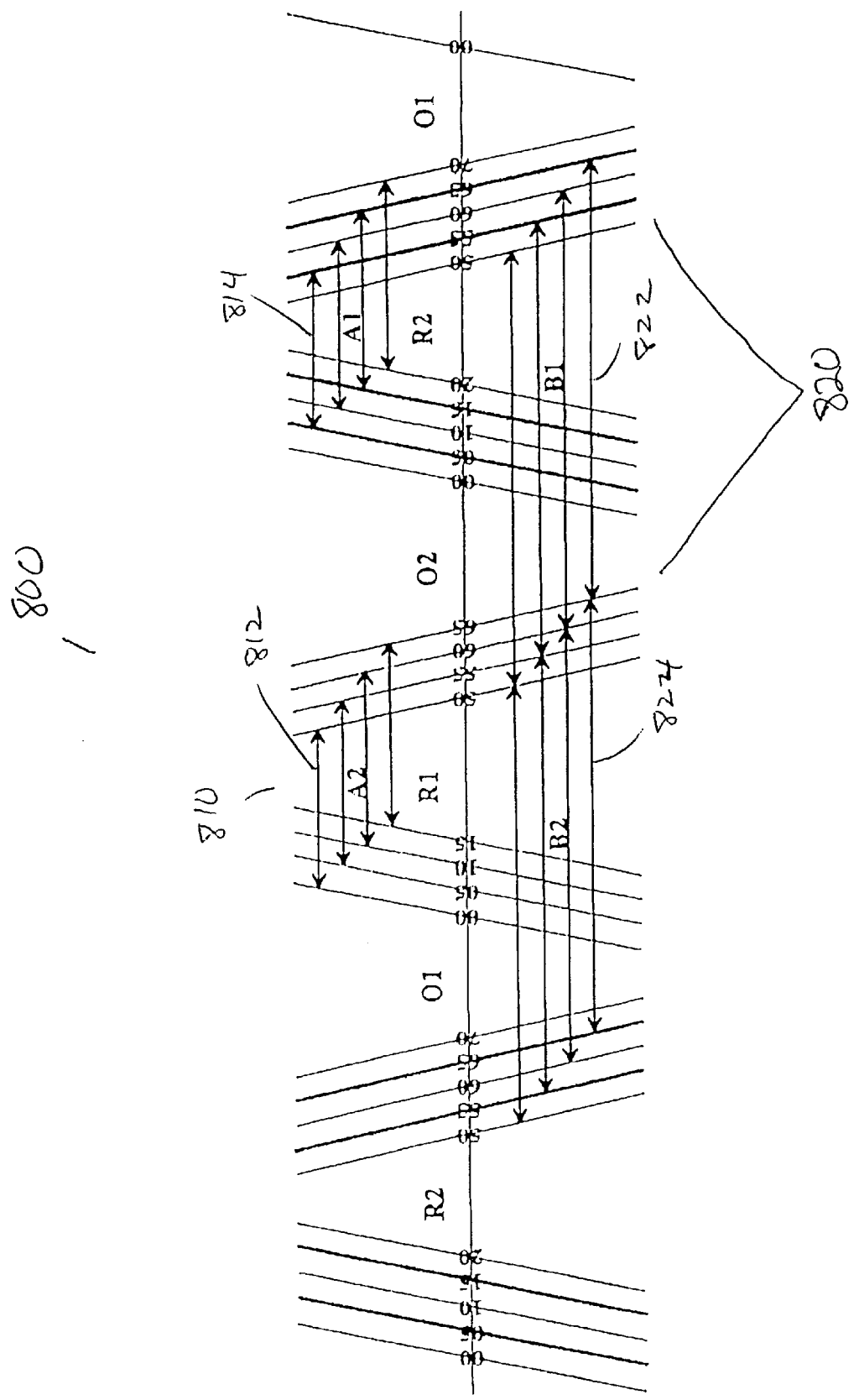
FIG. 8 illustrates a portion of the LTO media servo format according to the present invention.

FIG. 8 illustrates a portion of the LTO media servo format 800 according to the present invention. In creating the LTO media servo format 800 as illustrated in FIG. 8, the format writer will write down both the left and right of the A stripe 810 at the same time (geometric shape of formatter head). The B time intervals 820 are written in one at a time as the tape is going by the formatter head. As a result, the A distances 812, 814 are precise due to the formatter head while the B distances 822, 824 directly depend on the precision of the formatter velocity. When longitudinal vibration occurs in the formatter, this will directly show up in B distances 822, 824.

The equation for generating Position Error Signal is PES=ref-A/B, where the A and B are the time measurements of the A1, A2 and B1, B2 distances as shown in FIG. 8. Therefore, when longitudinal vibration occurs in the formatter causing deviations in the B distances 822, 824, the written-in velocity vibrations will show up in the PES signal also. This written-in velocity vibration generates oscillation in the PES signal and in turn will degrade the performance of the track following servo system.

In many cases, the problem is so severe that it causes intolerable number of 'stop writes' (a vibration that causes more than 5 um of tracking error signal). A direct filtering out of this oscillation on the PES is not feasible since it will cause too much loss of phase margin and make the overall tracking following servo system unstable.

Figure 9:
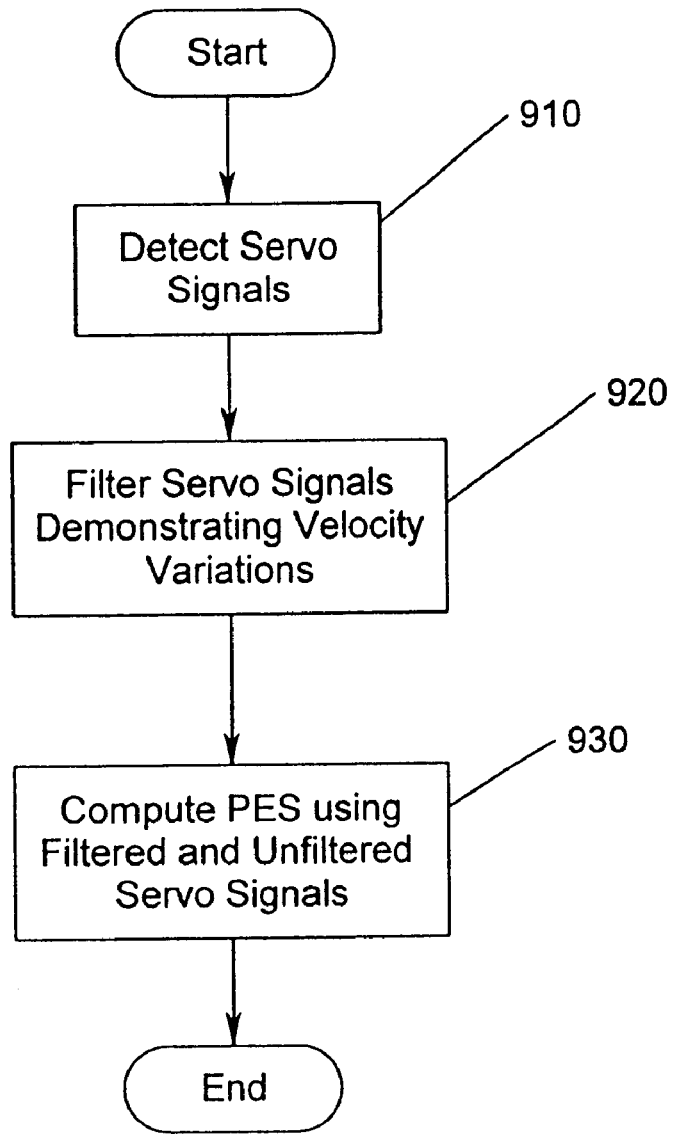
FIG. 9 is a flow chart of the process for performing position error signal conditioning of LTO media servo format written-in velocity variation according to the present invention.

FIG. 9 is a flow chart 900 of the process for performing position error signal conditioning of LTO media servo format written-in velocity variation according to the present invention. In FIG. 9, the servo head detects the components of the servo signals and sends them to the servo controller for processing 910. The components of the servo signals that demonstrate velocity vibrations or deviations, i.e., the B time interval components, are filtered 920. Then, the unfiltered servo components, i.e., the A time interval components, and the filtered servo components, i.e., the filtered B servo components, are processed to derive the position error signals 930 (see filters 222 in FIG. 2). The position error signals are thus derived according to the equation:

$$PES=ref-A/(B\text{ filtered})$$

The velocity variation in B is eliminated so that it will not show up in PES and since there is no filtering done to PES, its phasing is unchanged. As a result, media with servo format written-in velocity variation problem can be filtered out and does not cause any track following performance degradation.

Moreover, the filter may be accomplished by a notch or a low pass filter to the B component to get rid of the velocity variation before applying to the PES generation equation. Further, the filtering of the signals exhibiting velocity vibrations may be performed in hardware or software.

Figure 10:
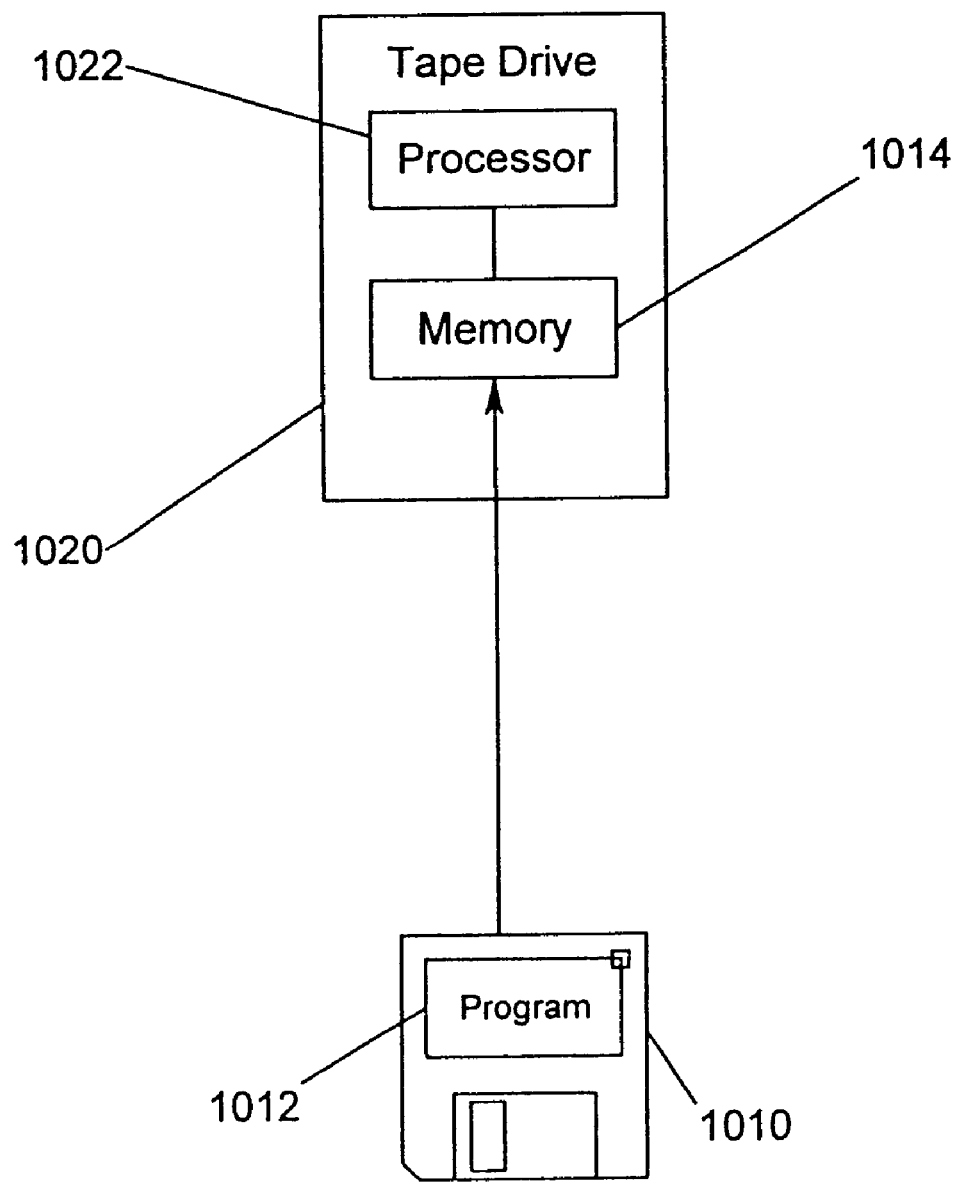
FIG. 10 is a block diagram that illustrates an exemplary hardware environment for performing position error signal conditioning of LTO media servo format written-in velocity variation according to the present invention.

The process illustrated with reference to FIGS. 8–9 may be tangibly embodied in a computer-readable medium or carrier, e.g. one or more of the fixed and/or removable data storage devices 1010 illustrated in FIG. 10, or other data storage or data communications devices. A computer program 1012 on the storage device 1010 may be loaded into the memory 1014 or into the storage device 1010 to configure the storage system 200, as illustrated in FIG. 2, for execution. The computer program 1012 comprise instructions which, when read and executed by a processor 1022 of the storage system 200, as illustrated in FIG. 2, causes the storage system 200, as illustrated in FIG. 2, to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing position error signal conditioning of LTO media servo format written-in velocity variation, comprising:
    detecting flux transitions in servo signal bursts to produce detected servo signals;
    filtering detected servo signals exhibiting velocity vibrations; and
    computing position error signals using filtered detected servo signals and detected servo signals not requiring filtering.

2. The method of claim 1 wherein the flux transitions comprise a series of A-shaped burst pairs.

3. The method of claim 2 wherein the series of A-shaped burst pairs extend along the media.

4. The method of claim 1 wherein the signals exhibiting velocity vibrations are flux transitions in the burst of servo signals that have a spacing that depends on the precision of the formatter velocity.

5. The method of claim 4 wherein the signals not exhibiting velocity vibrations are flux transitions in the burst of servo signals that have a spacing that is dependent upon the fixed structure of the servo burst formatter head.

6. The method of claim 1 wherein the signals not exhibiting velocity vibrations are flux transitions in the burst of servo signals that have a spacing that is dependent upon the fixed structure of the servo burst formatter head.

7. The method of claim 1 wherein the flux transitions in servo signal bursts include a first and second burst forming a first A-shaped burst pair, a third and fourth burst forming a second A-shaped burst pair, and a fifth and sixth burst forming a third A-shaped burst pair, wherein each burst comprises a plurality of legs and wherein each burst in a burst pair are angled toward each other, each of the A-shaped burst pairs having a spacing that is dependent upon the fixed structure of the servo burst formatter head, and the spacing between burst pairs being dependent on the precision of the formatter velocity.

8. The method of claim 7 wherein a time measurement of the spacing between flux transitions in the third and fourth burst and between the flux transitions in the fifth and sixth burst comprises an A time interval and the spacing between the flux transitions in the second and fourth burst and between the flux transitions in the fourth and sixth burst comprise a B time interval.

9. The method of claim 8 wherein the B time intervals exhibit velocity vibrations because of the precision of the formatter velocity, wherein the position error signal is computed according to:

$$PES=ref-A/(B\text{ filtered}),$$

wherein A represents unfiltered A time interval servo components and B filtered represents filtered B time interval servo components.

10. The method of claim 7 wherein each A-shaped burst comprises at least four flux transition legs, wherein each A-shaped burst comprises at least four legs.

11. The method of claim 7 wherein the series of A-shaped burst pairs comprise a leading and a trailing edge, the A-shaped burst pairs providing an A-time interval measured by a servo head from the leading edge to the trailing edge of an A-shaped burst pair.

12. The method of claim 11 wherein each of the A-shaped burst pairs comprise a plurality of legs, wherein the legs of the burst pair are configured with a predetermined spacing at a first end and getting larger toward an opposite end at a predetermined angle to provide lateral position of the servo head.

13. The method of claim 12 wherein the series of A-shaped burst pairs comprise a leading and a trailing edge, the A-shaped burst pairs providing a B-time interval measured by a servo head from a leading edge of one A-shaped burst pair to the leading edge of the next A-shaped burst pair.

14. The method of claim 13 wherein the B-time interval is constantly independent with the lateral position of the servo head.

15. The method of claim 14, wherein the B-time interval is modulated if the servo formatter has velocity variations during writing of the format pattern, wherein the position error signal is computed according to:

$$PES=ref-A/(B\ filtered),$$

wherein A represents the A-time interval and B filtered represents the filtered B-time interval.

16. A tape drive, comprising:
a magnetic recording tape having servo signal bursts of flux transitions recorded thereon, the servo bursts comprising a configuration of stripes of A spacings and B spacings;
a servo head disposed proximate to the magnetic recording tape for sensing the flux transitions of the servo signal bursts; and
a servo controller, coupled to the servo head, for receiving the sensed signals from the servo head, the servo controller further comprising a filter for filtering the B time interval servo signal components and computing a position error signal according to:

$$PES=ref-A/(B\ filtered),$$

wherein A represents unfiltered A time interval servo components and B filtered is filtered B time interval servo components.

17. The tape drive of claim 16 wherein the filter comprises a low pass filter.

18. The tape drive of claim 16 wherein the filter comprises a notch filter.

19. The tape drive of claim 16 wherein the filter comprises filtering software implemented in the servo controller.

20. An article of manufacture comprising a program storage medium readable by a computer, the medium tangibly embodying one or more programs of instructions executable by the computer to perform a method for performing position error signal conditioning of LTO media servo format written-in velocity variation, the method comprising:
detecting flux transitions in servo signal bursts to produce detected servo signals;
filtering detected servo signals exhibiting velocity vibrations; and
computing position error signals using filtered detected servo signals and detected servo signals not requiring filtering.

21. The article of manufacture of claim 20 wherein the flux transitions comprise a series of A-shaped burst pairs.

22. The article of manufacture of claim 21 wherein the series of A-shaped burst pairs extend along the media.

23. The article of manufacture of claim 20 wherein the signals exhibiting velocity vibrations are flux transitions in the burst of servo signals that have a spacing that depends on the precision of the formatter velocity.

24. The article of manufacture of claim 23 wherein the signals not exhibiting velocity vibrations are flux transitions in the burst of servo signals that have a spacing that is dependent upon the fixed structure of the servo burst formatter head.

25. The article of manufacture of claim 20 wherein the signals not exhibiting velocity vibrations are flux transitions in the burst of servo signals that have a spacing that is dependent upon the fixed structure of the servo burst formatter head.

26. The article of manufacture of claim 20 wherein the flux transitions in servo signal bursts include a first and second burst forming a first A-shaped burst pair, a third and fourth burst forming a second A-shaped burst pair, and a fifth and sixth burst forming a third A-shaped burst pair, wherein each burst comprises a plurality of legs and wherein each burst in a burst pair are angled toward each other, each of the A-shaped burst pairs having a spacing that is dependent upon the fixed structure of the servo burst formatter head, and the spacing between burst pairs being depends on the precision of the formatter velocity.

27. The article of manufacture of claim 26 wherein the spacing between flux transitions in the third and fourth burst and between the flux transitions in the fifth and sixth burst comprises an A time interval and the spacing between the flux transitions in the second and fourth burst and between the flux transitions in the fourth and sixth burst comprise a B time interval.

28. The article of manufacture of claim 27 wherein the B time intervals exhibit velocity vibrations because of the precision of the formatter velocity, wherein the position error signal is computed according to:

$$PES=ref-A/(B\ filtered),$$

wherein A represents unfiltered A time interval servo components and B filtered represents filtered B time interval servo components.

29. The article of manufacture of claim 26 wherein each A-shaped burst comprises at least four legs.

30. The article of manufacture of claim 26 wherein the series of A-shaped burst pairs comprise a leading and a trailing edge, the A-shaped burst pairs providing an A-time interval measured by a servo head from the leading edge to the trailing edge of an A-shaped burst pair.

31. The article of manufacture of claim 30 wherein each of the A-shaped burst pairs comprise a plurality of legs, wherein the legs of the burst pair are configured with a predetermined spacing at a first end and a larger predetermined spacing at an opposite end to provide lateral position of the servo head.

32. The article of manufacture of claim 31 wherein the series of A-shaped burst pairs comprise a leading and a trailing edge, the A-shaped burst pairs providing a B-time interval measured by a servo head from a leading edge of one A-shaped burst pair to the leading edge of the next A-shaped burst pair.

33. The article of manufacture of claim 32 wherein the B-time interval is a constant independent with the lateral position of the servo head.

34. The article of manufacture of claim 33, wherein the B-time interval is modulated if the servo formatter has velocity variations during writing the format pattern, wherein the position error signal is computed according to:

$$PES=ref-A/(B\ filtered),$$

wherein A represents the A-time interval and B filtered represents the filtered B-time interval.

* * * * *

UNITED STATES PATENT AND TRADEMARK OFFICE
CERTIFICATE OF CORRECTION

PATENT NO.    : 6,762,900 B2
DATED         : July 13, 2004
INVENTOR(S)   : Bui et al.

It is certified that error appears in the above-identified patent and that said Letters Patent is hereby corrected as shown below:

Title page,
Item [75], Inventors, should read
-- Nhan X. Bui, Tucson, AZ (US); John Alexander Koski, Livermore, CA (US); Akimitsu Sasaki, Yokohama-Shi (JP); Kazuhiro Tsuruta, Kanagawa (JP) --

Signed and Sealed this

Fourteenth Day of December, 2004

JON W. DUDAS
*Director of the United States Patent and Trademark Office*